(12) United States Patent
Killoran, Jr. et al.

(10) Patent No.: US 10,305,839 B2
(45) Date of Patent: May 28, 2019

(54) ELECTRONIC INFORMATION SYSTEM ENABLING EMAIL-BASED TRANSACTIONS WITH FORMS

(71) Applicant: CLOVER LEAF ENVIRONMENTAL SOLUTIONS, INC., Albuquerque, NM (US)

(72) Inventors: John P. Killoran, Jr., Albuquerque, NM (US); Gina Katharine Von Damm, Davis, CA (US)

(73) Assignee: Clover Leaf Environmental Solutions, Inc., Albuquerque, NM (US)

( * ) Notice: Subject to any disclaimer, the term of this patent is extended or adjusted under 35 U.S.C. 154(b) by 247 days.

(21) Appl. No.: 15/354,833

(22) Filed: Nov. 17, 2016

(65) Prior Publication Data
US 2017/0142057 A1    May 18, 2017

Related U.S. Application Data

(60) Provisional application No. 62/256,478, filed on Nov. 17, 2015.

(51) Int. Cl.
*H04L 12/58* (2006.01)
*H04L 29/06* (2006.01)
*H04L 29/08* (2006.01)

(52) U.S. Cl.
CPC .............. *H04L 51/22* (2013.01); *H04L 51/10* (2013.01); *H04L 67/02* (2013.01); *H04L 67/14* (2013.01); *H04L 67/42* (2013.01)

(58) Field of Classification Search
CPC ......... H04L 51/10; H04L 51/22; H04L 67/02; H04L 67/14; H04L 67/42
See application file for complete search history.

(56) References Cited

U.S. PATENT DOCUMENTS

| 5,913,210 | A  | * | 6/1999  | Call      | G06Q 20/201 |
| 6,154,738 | A  | * | 11/2000 | Call      | G06Q 20/201 |
|           |    |   |         |           | 705/20 |
| 9,704,148 | B2 | * | 7/2017  | Killoran, Jr. | G06Q 20/12 |
| 9,704,184 | B2 | * | 7/2017  | Killoran  | G06Q 30/0279 |
| 9,710,797 | B2 | * | 7/2017  | Killoran, Jr. | G06Q 20/12 |
| 9,996,862 | B2 | * | 6/2018  | Killoran  | G06Q 10/107 |
| 2002/0161745 | A1 | * | 10/2002 | Call   | A61L 2/10 |
| 2004/0158612 | A1 | * | 8/2004  | Concannon | H04L 29/06 |
|           |    |   |         |           | 709/206 |

(Continued)

FOREIGN PATENT DOCUMENTS

| GB | 2474661 A | * | 4/2011 | ........... G06Q 10/107 |
| JP | 2009217638 A | * | 9/2009 | |
| JP | 2015184752 A | * | 10/2015 | |

*Primary Examiner* — Kostas J Katsikis
(74) *Attorney, Agent, or Firm* — Volpe and Koenig, P.C.

(57) ABSTRACT

A method and apparatus for improving digital transaction using Simple Mail Transfer Protocol (SMTP). The method includes determining to whether an alert related to a task is sent to a registered individual, on a condition that the alert related to the task should be sent, generating an email message, wherein the email includes at least one mailto link and a form for the registered individual to complete, transmitting the email message to the registered individual, receiving a response email from the registered individual, authenticating the email message and decoding a token, and updating an information database.

20 Claims, 16 Drawing Sheets

(56) References Cited

U.S. PATENT DOCUMENTS

| | | | |
|---|---|---|---|
| 2005/0022008 A1* | 1/2005 | Goodman | G06Q 10/107 |
| | | | 726/4 |
| 2006/0015564 A1* | 1/2006 | Angelica | H04L 51/28 |
| | | | 709/206 |
| 2008/0208984 A1* | 8/2008 | Rosenberg | G06Q 10/107 |
| | | | 709/206 |
| 2009/0049146 A1* | 2/2009 | Okita | H04L 51/066 |
| | | | 709/206 |
| 2009/0300127 A1* | 12/2009 | Du | H04L 51/14 |
| | | | 709/206 |
| 2014/0032899 A1* | 1/2014 | Kaufman | G06F 21/6209 |
| | | | 713/165 |
| 2014/0082103 A1* | 3/2014 | Baxter, Jr. | H04L 51/36 |
| | | | 709/206 |
| 2015/0332365 A1* | 11/2015 | Kassemi | H04L 51/38 |
| | | | 705/26.41 |
| 2016/0300231 A1* | 10/2016 | Shavell | G06Q 20/4016 |
| 2016/0308840 A1* | 10/2016 | Munshi | H04L 63/0428 |
| 2016/0358174 A1* | 12/2016 | Kassemi | H04L 67/02 |
| 2017/0017939 A1* | 1/2017 | Killoran, Jr. | G06Q 20/102 |

* cited by examiner

REPLY — 332

334 {
From: task.mgmt@company.com — 335
To: john.smith@company.com — 337
Cc:
Subject: Medical Info
Attachments: Med001
}

336 {
John Smith,
Please complete the following form. Select 'Submit' when the form is completed form and send the email.

338 — SUBMIT

Thanks,
Information Management System
}

340 {
PROGRESS NOTE

[form fields]
}

☐
SEND ⟵ 360

To: info.mgmt@company.com ⟵ 365
Cc: ⟵ 367
369 ⟵ BCC:
Subject: Response Task ID001-FORM$ ⟵ 371
Attachments:Med001 ⟵ 373

375 {
Once you have completed the form please hit send to submit your paperwork. Please be sure to send it from the email account where we emailed you.

Thanks,
Information Management System

380 {
PROGRESS NOTE

*(form fields including Date of Service, Client Number, DOB, Type of Service, Location of Service, Billing, Issues Addressed, etc.)*

Hi Robert

Log Out   540

Form Maker — 542   Your Account — 544   Security — 546   Reports — 548   Messaging — 550

Your Personal Reference Title

Financial End Of Month — 552

Title of Form (What Users See)

November Update — 554

Department — 556
☐ Admin   ☐ Tech Support   ☒ Engineering   ☐ Finance   ☐ All

Template — 558
☐ Internal   ☐ Client 1   ☒ Client 2   ☐ Client 3

Distribution List — 560
☐ Internal   ☐ List 1   ☒ List 2   ☐ List 3

[Submit] — 565

Hi Robert                                           Log Out    570

[Form Maker]    Your Account    Security    Reports    Messaging

New Panel    Delete         Font         Size
Just Text    Written Answer    Y/N        Multiple Choice
Email Signature Required         Registered Only Financial End Of Month November Update                Client 2
                    572
Engineering Panel 1
    Hi All, Just need a quick update on our projects.

Panel 2
    How many Client 2 employees have
    you contacted?                            [    ]         574

Panel 3
    How have you contacted them? ☐Phone ☐Email ☐Snail Mail

Panel 4
    Did they respond? ☐Yes   ☐No

[Delete]         [Save]         [Preview]    [SEND]

ELECTRONIC INFORMATION SYSTEM ENABLING EMAIL-BASED TRANSACTIONS WITH FORMS

CLAIM FOR PRIORITY

This application claims the benefit of U.S. Provisional Application No. 62/256,478 filed Nov. 17, 2015, which is/are incorporated by reference as if fully set forth.

FIELD OF INVENTION

The present invention is related to electronic information systems. More particularly, the present invention is a system and method that aids in task management system in storage communication, display, and reporting with forms using email, SMS, and social media.

BACKGROUND

An organization, such as a military unit, commercial enterprise, nonprofit, utility, government office or other type of organization, may be required to periodically perform one or more tasks in order to achieve goals and/or comply with requirements associated with their particular domain. In one example, a commercial enterprise or commercial unit may be required to comply with state or federal regulations. Conformance to the state or federal regulations may require the periodic performance of tasks such as inspecting of hazardous waste accumulation areas, complete hazardous materials inventory, verifying medical claims, human resources training, police or military status checks, emergency response tasks, updating or maintaining state or federal records, and/or other tasks.

Current information management systems allow organizations to define tasks, assign tasks to individuals, and monitor completion of the tasks that have been assigned to those individuals. However, these information management systems are difficult to use, unnecessarily complex, and frequently include many features that are not of interest to the user. Further, these information management systems typically include their own login and/or authentication mechanisms, thereby adding an additional layer of complexity and inconvenience to their use. Therefore, new information management technologies are required to provide a more streamlined and straightforward user experience than what is provided in current technologies.

Many of the tasks that require monitoring by the organization are the completion of forms. Information management systems, form applications, and messaging are not well integrated and may be confusing to users. Methods of communication, task management, and form applications are difficult to integrate for organizations. Organizations find this situation intolerably confusing. A system that integrates messaging, with the use of forms and information management of tasks would be welcome in the market place.

Current information management systems require users to make up dates using a single method of communication. This is inconvenient and impractical, in an environment where multiple forms of communication happen on a single device. A method that allows for multiple forms of communication would be welcome in the market place.

SUMMARY

Individuals may be registered with the information management system and be associated with a group. An information management system may store information related to tasks to be performed or tasks related to forms to be completed by registered individuals in a group. These forms may be attached to the message or embedded in the message. The information management system may transmit information to the registered individuals regarding tasks they are expected to perform, actions they have taken or opinions they have formed. Further, the information management system may receive completed forms in emails from the registered individuals regarding the progress of the performance of the tasks, such as whether a particular task has been completed, partially complete, encountering problems or is still in progress. The information management system may receive forms transmitted from the registered individuals regarding the progress of the performance or other criteria. The information management system may also receive requests to generate reports regarding task status and progress information held by the forms across the organization or group and communicate the report to the registered individuals. Communication between the registered individuals and the information management system may be performed by email, SMS or social media.

The registered individuals may use the secure environment of their email, SMS, or social media account to transmit response messages and forms to the information management system. Therefore, the information management system may not require a login or authentication procedure that is specific to the information management system. Registered individuals may interact with the information management system without logging into the information management system.

The information management system may be included in an architecture that also includes one or more client modules such as an email client module, SMS handler or social media network, and/or a report display module that is used by registered individuals in the organization. The information management system may generate an email, SMS, or social media message transmission to the registered individual. The message may include one or more links or forms. The registered individuals may fill out a form included with the response message. The content of the links or forms may be included in the response message back to the information management system. The new message may be sent back to the information management system. The information management system may then perform the action indicated by the action type parameter. The action type may be, for example, updating a database to indicate a status or storage of a task and/or response to a form.

BRIEF DESCRIPTION OF THE DRAWINGS

A more detailed understanding may be had from the following description, given by way of example in conjunction with the accompanying drawings wherein:

FIGS. 3A-C illustrate an example of possible form types;

FIGS. 5B-C illustrate examples of forms that may be messaged from the information management system to a registered individual that requires the new form;

DETAILED DESCRIPTION

All embodiments described below may be used in tandem or in relation to specific vendor or customer needs. They may also be integrated with an email service provider, customer relationship management, or directly with a payment processor. Although the description below focuses on the use of Short Message Service (SMS) and email, social media network messaging may also be used. The configuration of the system may vary based on client needs.

Figure 1A:
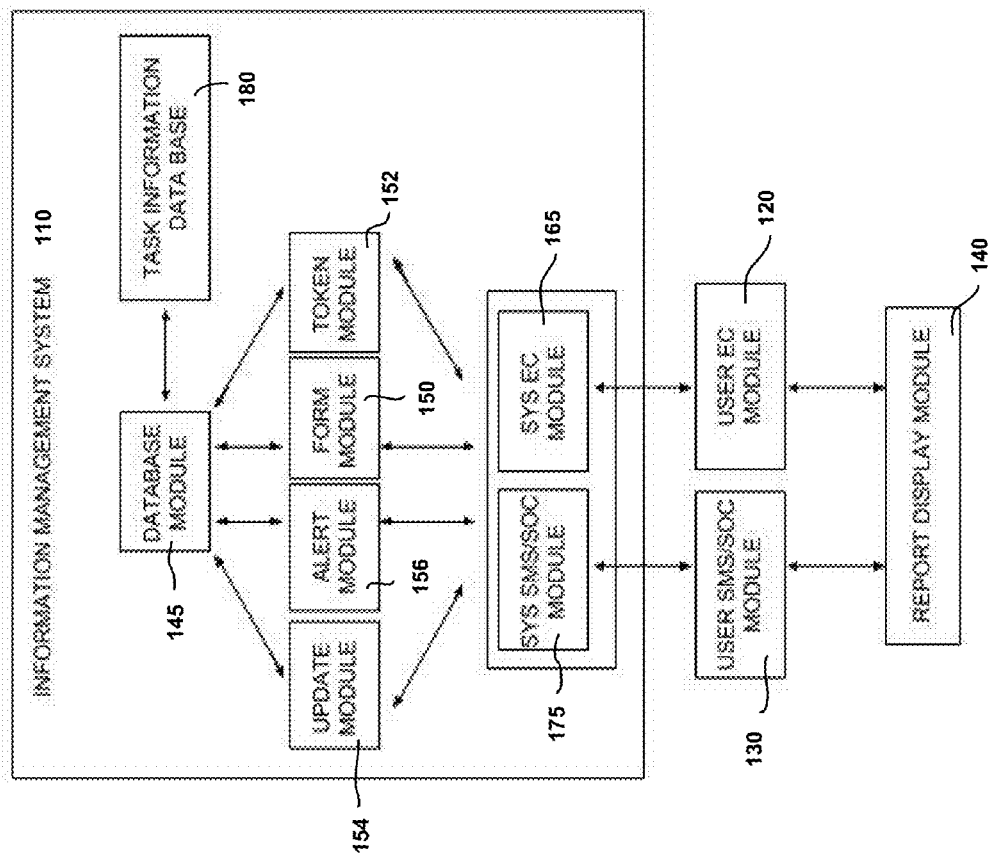
FIG. 1A illustrates an example architecture that may be used for the communication storage and display of information related to task management via email, SMS and social media with the use of forms.

FIG. 1A shows an example architecture 100 that may be used for the communication storage and display of information related to task management via email, SMS (Short Message Service), and social media with the use of forms. The example architecture 100 includes an information management system 110, a registered individual's email client module 120, SMS and social media module 130, and a report display module 140. As will be described in further detail below, the information management system 110 may store information related to tasks to be performed by registered individuals in a group, and may transmit information to registered individuals regarding tasks they are expected to perform. Further, the information management system 110 may receive information from the registered individual's regarding the progress of the performance of tasks (e.g., whether a particular task has been completed or is still in progress). The messages may include forms which the registered individuals fill out and the information management system 110 decodes and stores. The information management system 110 may generate reports regarding task progress across the group and communicate the reports to registered individuals. Reports may be part of the task alerts or forms, or included in a separate set of messaging.

The information management system 110 may include a form module 150, an update module 154, an alert module 156, a token module 152, a system email client module 165, a system SMS and social media module 175, a report display module (not depicted), a database module 145, and a task information database 180. The task information database 180 may store information related to one or more tasks one or more organizations, and one or more individual users, and/or other task-related information. Tasks as used herein may also incorporate forms for use with tasks, for example. The database module 145 may perform functionality such as adding data to, modifying data in, querying data from, and/or retrieving data from the task information database 180.

The alert module 156 may perform functionality such as determining when an alert message related to a task should be sent to a registered individual. An alert message may indicate, for example, that the registered individual is required to complete a task and/or what the registered individual is required to perform in order to complete the task.

The system email client module 165 may perform functionality such as the transmission and reception of email messages. The system email client module 165 may be configured to use one or more email accounts that are associated with the information management system 110, and to receive messages associated with the one or more email accounts. As an example, when the alert module 156 makes a determination that an alert message is sent to a registered individual, the alert module 156 may communicate the contents of the email message to the system email client module 165, and the system email client module 165 may transmit a corresponding email message. Further, when a new email message is received at an email account used by the system email client module 165, the system email client module 165 may communicate the email messages to the update module 154 and/or the form module 150.

The system SMS and social media module 175 may perform functionality such as the transmission and reception of messages. The system SMS and social media module 175 module may be configured to use one or more accounts that are associated with the information management system 110, and to receive messages associated with the one or more SMS and social media module accounts. As an example, when the alert module 156 makes a determination that an alert message should be sent to a registered individual, the alert module 156 may communicate the contents of the message to the system SMS and social media module 175, and the system SMS and social media module 175 may transmit a corresponding message. Further, when a new message is received at an SMS and social media account used by the system SMS and social media module 175, the system SMS and social media module 175 may communicate the messages to the update module 154 and/or the form module 150.

The update module 154 may perform functionality related to updating the task information database 180 based on messages from registered individuals that are received by the system email client module 165. For example, the update module 154 may periodically check the system email client module 165 to determine if a new email message has been received. If the update module 154 determines that an email message indicates that a task has been completed, the update module 154 (in conjunction with the database module 145) may update the task information database 180 accordingly.

The form module 150 may perform functionality related to providing forms or reports to registered individuals in the group. For example, the form module 150 may periodically check the system email client module 165 to determine if a new email message has been received. If the form module 150 determines that a new email message has been received that indicates a request for a form from a registered individual, the form module 150 may generate the corresponding form, and may communicate the form to the system email client module 165. The system email client module 165 may then transmit a corresponding email message that includes the form to the registered individual that requested the form. The display module may then display the form via a display device (not depicted).

The registered user email client module 120 may perform functionality related to the communication and display of email messages. The registered user email client module 120 may be configured to use an email account that is associated with a registered individual in the organization, and to receive messages associated with the email account.

The system email client module 165 and/or the registered user email client module 120 may communicate email messages using technologies such as Simple Mail Transfer Protocol (SMTP), Post Office Protocol (POP) technology, Internet Message Access Protocol (IMAP), Remote Procedure Call (RPC) technology, HyperText Transfer Protocol (HTTP), and/or other appropriate technologies. The system email client module 165 and/or the registered user email client module 120 may be or include an email client such as Microsoft Outlook, Apple Mail, GMail, Thunderbird, a web browser, or any other client application for the communication of email messages. The system email client module 165 and/or registered user email client module 120 may communicate email messages via one or more email servers (not depicted).

The registered user SMS and social media module 130 may perform functionality related to the communication and display of messages. The registered user SMS and social media module 130 may be configured to use an email account that is associated with a registered individual in the organization, and to receive messages associated with the SMS and social media account.

The system SMS and social media module 175 and/or the registered user SMS and social media module 130 may communicate messages using Short Message Service (SMS), and social media networks may also be used. Although some examples and discussion herein generally use SMS, other texting formats may be substituted for SMS including Extensible Markup Language (XMPP), multimedia messaging service (MMS), Session Initiation Protocol (SIP), Voice over Internet Protocol (VoIP), Messaging Queuing Telemetry Transport (MQTT), and Apple Push Notification Service (APNS) used in services such as Viber, Whatsapp, Facebook Messenger, iMessage and other forms of Internet Telephony Protocol. Various forms of social media may be used such as Facebook and Twitter. The system SMS and social media module 175 and/or the registered user SMS and social media module 130 may be or include an SMS and social media account such as iMessage, Whatsapp, Viber, Facebook, Twitter, a web browser, or any other messaging application for the communication of SMS and social media messages. The system SMS and social media module 175 and/or registered user SMS and social media module 130 may communicate messages via one or more SMS and social media servers (not depicted).

The task information database 180 may be spread across one or any number of computer-readable storage media (not depicted). The task information database 180 may be or include, for example, a relational database, a hierarchical database, an object-oriented database, a flat file, a spreadsheet, or a structured file. The database module 145 may interface with a database management system (not depicted) in order to add data to, modify data in, or obtain data from the task information database 180. Alternatively or additionally, the database module 145 may perform database drive and/or database client functionality to interact with the database management system. The database management system may be based on a technology such as Microsoft SQL Server, Microsoft Access, MySQL, PostgreSQL, Oracle Relational Database Management System (RDBMS), or any other appropriate technology.

The task information database 180 may include data that describes tasks in terms of "recurrences." The task information database 180 may include forms, and store forms, used for completing tasks, for example. A "recurrence" is an instance of a performance of a task. As an example, an organization may be required update its hazardous material inventories once per month. In this example, the "task" is updating hazardous material inventories, and the task is associated with a "recurrence" for each month. The task information database 180 may therefore include information that indicates that the task is associated with a recurrence each month. Further, for each task, the task information database 180 may include information such as one of or any combination of the following: an identifier of the task; a name of the task; a description of the task; an area related to the task; a date on which the task is due; an end date for the task; one or more alert dates that indicate when alert messages related to the task should be sent; files that are related to the task; an identifier of a registered individual to whom the task should be escalated if the task is not timely completed; recurrence information; and/or other information. Recurrence information for a task may include, for example, how often a task recurs, in which week a task recurs, on what day a task recurs, and/or other information.

For each recurrence of a task, the task information database 180 may include information such as one of or any combination of the following: an identifier of the recurrence; an identifier of the associated task; a date on which the task/recurrence must be performed; one or more dates on which alerts related to the recurrence should be sent; information that indicates whether alerts related to the recurrence have been sent; an identifier of the registered individual assigned to perform the task/recurrence; information that indicates when and/or if information an escalation email was sent; information related to performance of the task/recurrence; and/or other information. Information related to performance of the task/recurrence may include, for example, information that indicates that the task has been completed or is still in progress, a time at which the registered individual indicated that the recurrence was completed or is still in progress, an identifier of the registered individual who completed the recurrence, and/or comments from the registered individual related to progress of the performance of the recurrence. A spell-checker module (not depicted) in the information management system 110 may periodically perform spelling and grammar corrections on the comments that are included in the task information database 180.

For each registered individual, the task information database 180 may include information such as one of or any combination of the following: an identifier; a first name; a last name; a position title or job description; an email address; one or more phone numbers; one or more fax numbers; an identifier of the organization with which the registered individual is associated; and/or other information. The information may also include privileges and/or security information, such as whether the registered individual is authorized as an administrator and/or what level of privileges are possessed by the registered individual. Although in this method described an individual is required to be registered there may be a version of the system were different requirements may be used. The task information database 180 may also include information that describes one or more email signatures associated with the registered individual.

For each organization in the task information database 180, information may be stored such as: an identifier of the organization; a name of the organization; a description of the organization; and/or other information. The task information database 180 may also include information that describes facilities that are associated with an organization. For each facility in the task information database 180, the task information database 180 may include information such as the name of the facility and the address of the facility. The task information database 180 116 may also include information that indicates which facility a registered individual is associated with.

Each or any combination of the modules described herein above may be implemented as software modules, specific-purpose processor elements, or as combinations thereof. Suitable software modules include, by way of example, an executable program, a function, a method call, a procedure, a routine or sub-routine, one or more processor-executable instructions, an object, or a data structure.

Figure 1B:
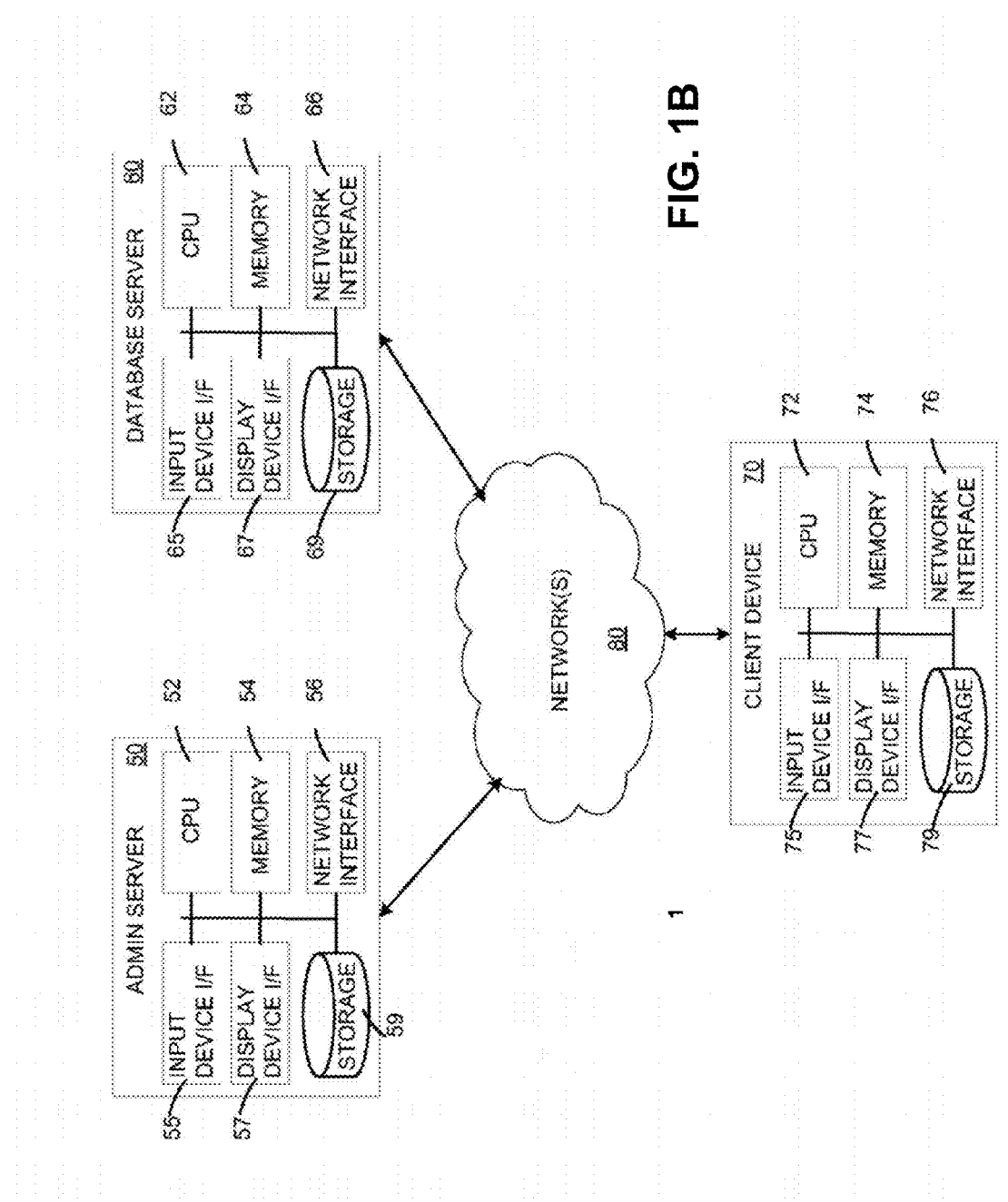
FIG. 1B shows an example system that may be used to implement the communication, storage and display of information related to task management with the use of forms in the architecture of FIG. 1A.

FIG. 1B illustrates a systems diagram for the communication, storage, and display of information related to task management with the use of forms. All embodiments described below may be integrated with an email service provider, customer relationship management, or other application such as one used for training employees. Although the description below focuses on the use of email messaging, social media and SMS networks may also be substituted. Also disclosed herein are descriptions for SMS and social media versions of the system. The configuration of the information management system 110 may vary based on client needs or state and federal requirements. A method and system allows the information management system 110 to send emails to registered individuals where registered individuals may make updates to assigned tasks by selecting mailto links that are associated with each task. The registered individuals may send the response email to the information management system 110. The email may also contain an attached or embedded form which the registered individuals update or fill out. Each mailto link may hold a token generated by the information management system 110. The information management system 110 may authenticate the email and decode the token and form. The information from the token and form may be stored by the information management system 110 and shared with other registered individuals as tasks or reports. Limited access may be granted to non-registered individuals.

FIG. 1B shows an example system 1 that may be used to implement the architecture 100 of FIG. 1A. The example system 1 includes an administrative server 50, a database server 60, a client device 70, and one or more networks 80.

The administrative server 50 may include a processor 52, memory device 54, communication interface 56, input device interface 55, display device interface 57, and storage device 59. The database server 60 may include a processor 62, memory device 64, communication interface 66, input device interface 65, display device interface 67, and storage device 69. The client device 70 may include a processor 72, memory device 74, communication interface 76, input device interface 75, display device interface 77, and storage device 79.

The administrative server 50 may be configured to perform any feature or combination of features described herein as performed by the form module 150, update module 154, alert module 156, system SMS/social media module 165, system email client module 165, and/or database module 145. The storage device 69 in the database server 60 may store the task information database 180 or a portion thereof. The database server 60 may be configured to perform any feature or combination of features described herein related to the storage of data in the task information database 180. The client device 70 may be configured to perform any feature or combination of features described herein as performed by the user SMS/social media module 130, user email client module 120 and/or the report display module 140. The client device 70 may be, for example, a desktop computer, a laptop computer, a netbook, a tablet computer, a personal digital assistant (PDA), a cellular phone, or any other appropriate device.

Each or any of the memory devices 54, 64, 74 may be or include a device such as a Dynamic Random Access Memory (D-RAM), Static RAM (S-RAM), or other RAM or a flash memory. Each or any of the storage devices 59, 69, 79 may be or include a hard disk, a magneto-optical medium, an optical medium such as a CD-ROM, a digital versatile disk (DVDs), or Blu-Ray disc (BD), or other type of device for electronic data storage.

Each or any of the communication interfaces 56, 66, 76 may be, for example, a communications port, a wired transceiver, or a wireless transceiver. Each or any of the network interfaces 56, 66, 76 may be capable of communicating using technologies such as Ethernet, fiber optics, microwave, xDSL (Digital Subscriber Line), Wireless Local Area Network (WLAN) technology, wireless cellular technology, and/or any other appropriate technology. The communication interfaces 56, 66, 76 may be used by the administrative server 50, database module 145, and/or client device 70 to communicate via the one or more networks 80. The communication interfaces 56, 66, 76 may be used by the administrative server 50, database module 145, and/or client device 70 to communicate any message or combination of messages described herein as communicated by the system email client module 165, system SMS social media module 175, user email client module 120, user SMS/social media module 130 and/or database module 145. The one or more networks 80 may include one or more private networks and/or one or more public networks such as the Internet. The one or more networks 80 may be based on wired and/or wireless networking technologies.

Each or any of the input device interfaces 55, 65, 75 may an interface configured to receive input from an input device such as a keyboard, a mouse, a trackball, a scanner, a touch screen, a touch pad, a stylus pad, and/or other device. Each or any of the input device interfaces 55, 65, 75 may operate using a technology such as Universal Serial Bus (USB), PS/2, Bluetooth, infrared, and/or other appropriate technology.

Each or any of the display device interfaces 57, 67, 77 may be an interface configured to communicate data to a display device. Each or any of the display device interfaces 57, 67, 77 may operate using technology such as Video Graphics Array (VGA), Super VGA (S-VGA), Digital Visual Interface (DVI), High-Definition Multimedia Interface (HDMI), or other appropriate technology.

The memory 54 of the administrative computer 50 may store instructions which, when executed by the processor 52, cause the processor 52 to perform any feature or combination of features described herein as performed by the form module 150, update module 154, alert module 156, system SMS/social media module 165, system email client module 165, and/or database module 145. The memory 64 of the database server 60 may store instructions which, when executed by the processor 62, cause the processor 62 to perform any feature or combination of features described herein as related to the storage of data in the task information database 180. These features may include, for example, executing instructions related to a database management system, storing and/or modifying data in the task information database 180, and/or obtaining data from the task information database 180. The memory 74 of the client device 70 may store instructions which, when executed by the processor 72, cause the processor 72 to perform any feature or combination of features described herein as performed by the user email client module 120, user SMS/social media module 130 and/or the report display module 140.

The client device 70 may include or be connected to a display device (not depicted) via the display device interface 77. The display device may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device may be configured to display, based on data received from the input device interface 75, any graphical elements described herein as displayed by the user email client module 120, user SMS/social media module 130 and/or the report display module 140.

Figure 2A:
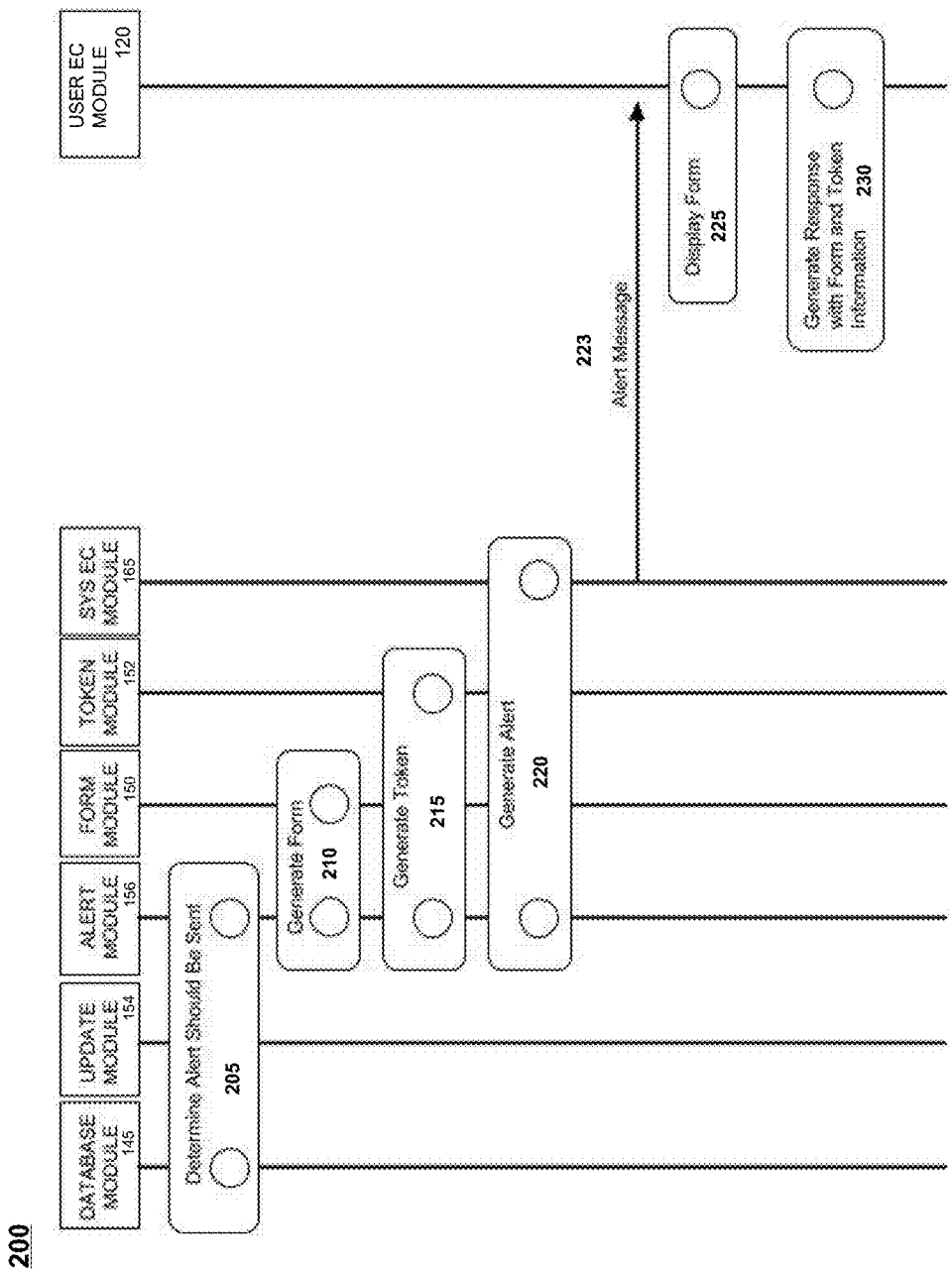
FIGS. 2A and 2B collectively illustrate a method for communication of an alert message to a registered individual and for updating a task information database based on the response to the alert message with the use of forms.
Figure 2B:
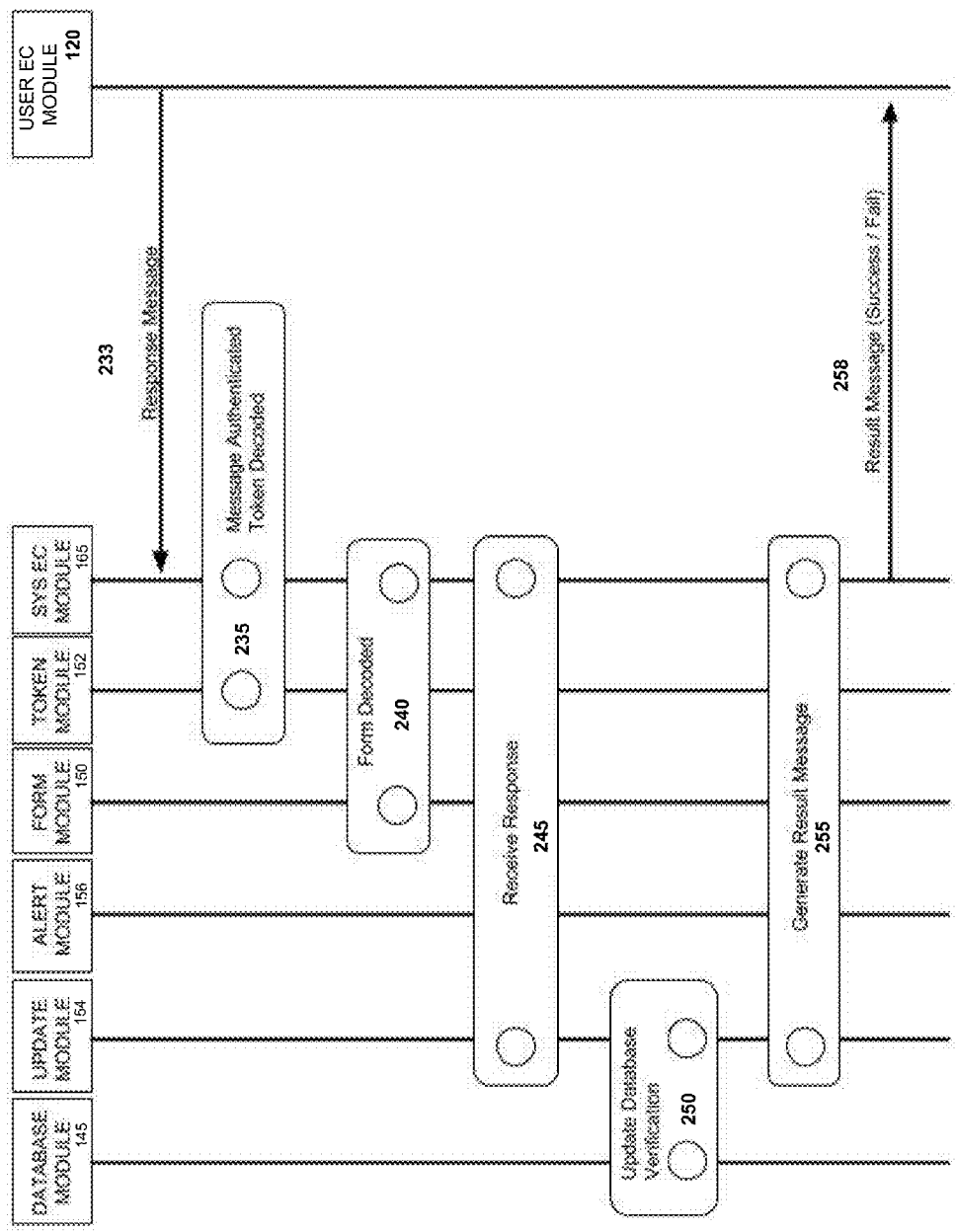

FIGS. 2A and 2B collectively illustrate a method 200 for communication of an alert message to a registered individual and for updating a task information database 180 based on the response to the alert message with the use of forms. As will be described in further detail below, the alert message may indicate that a task recurrence is expected to be performed by the registered individual. FIGS. 2A and 2B show the database module 145, the updating module, the alert module 156, the form module 150, the token module 152, the system email client module 165, and the device of the registered individual's (user) email client module.

Method 200 begin with the alert module 156 determining whether an alert related to the task recurrence may be sent at step 205. This determination may be performed based on data obtained via the database module 145 from the task information database 180. In one example, the alert module 156 may receive information from the task information database 180 which indicates that, for a particular task recurrence, an alert email is past due and has not been sent. The alert module 156, determining that an alert related to the task recurrence should be sent, requires a form and a token. This determination may be performed based on data obtained via the form module 150 and token module 152.

The alert module 156 and/or the system email client module 165 may then generate an email message with a form at step 210 and a token at step 215 to be transmitted to the registered individual assigned to perform the recurrence of the task. The email message or form may describe the task recurrence to be performed. Filling out the form may be the required task. The form may also be an image. The email message may indicate that it is being sent by one of the email accounts used by the system email client module 165. The email message may include one or more mailto links that, when clicked by the registered individual, create a new email response message that the registered individual may use to respond to the email message generated by the alert module 156 and/or system email client module 165. Further, the email message may also include one or more forms that provide information regarding the task recurrence to be performed and may be editable by the registered individual. The form may be an attachment, an embedded form, or predetermined email fields in which the registered individual responds to questions or requests. Alternatively the message may be an SMS or social media message.

The system email client module 165 may then transmit the generated email message at step 220 and share at step 223 the message with the device of the registered user's email client module 120. The email message may be received by the registered user's email client module 120 and displayed at step 225 by the registered user's email client module 120.

The registered individual may generate the response email by selecting a mailto link at step 230. If a form is included it may be automatically attached to response email. Each link may be for a different form. Alternatively, the form may be attached to the email once the form is completed by the registered individual. The email may include a token. The token may be anywhere in the email or the form. The response email is addressed to the information management system 110. Alternatively the selection of the hyperlink may generate the email and the form with the form completed in the window of the response email.

Referring now to FIG. 2B, the registered user's email client module 120 may, in response to a selection of the send button, transmit the email message based on contents of the in message composition with the information management system 110 at step 233.

The system email client module 165 and the token module 152 may then receive the email message. The system email client module 165 in conjunction with the token module 152 authenticates the email message and decodes the token at step 235. The system email client module 165 in conjunction with the form module 150 recognizes the required form decrypts and decodes the form at step 240. The system email client module 165 takes the responses from the token and the form and updates the update unit at step 245. This may include, for example, the update module 154 periodically querying the system email client module 165 for information related to new messages received by the system email client module 165 for one or more of the email accounts used by the information management system 110.

The update module 154 (in conjunction with the database module 145) may then verify the contents of the received message and update the task information database 180 accordingly at step 250. This may include for example the update module 154 parsing the contents of the received email message to determine if the message is formatted appropriately.

If the update module 154 successfully verifies the contents of the token and form in the response message, the update module 154 may communicate with the database module 145 to update the task information database 180 accordingly. For example, if the received message indicates that a task recurrence has been completed or is incomplete, the task information database 180 is updated to reflect the complete/incomplete status of the task recurrence. Additionally, the update module 154 may add the contents of the form with the email message to the task information database 180 as part of the task recurrence. The form contents may be the basis for other alerts or reports.

Alternatively, if the received message is a form, the update module 154 may add the form in the body of the email message to the task information database 180 as a comment or form on the email task recurrence.

Alternatively, if the received message may have a comment included by the registered individual in the form or the body of the email, the update module 154 may add the texts to the task information database 180 as a comment on the email task recurrence.

Alternatively, if the received message is a reassigned message, the update module 154 may update the task information database 180 to reflect that the task or task recurrence has been reassigned to the new registered individual.

As described above, the update module 154 may add a comment related to a task recurrence to the task information database 180 that is based on the contents of the received email message body or form. When doing so, the update module 154 may determine whether the email message body or form contains an email signature for the worker that transmitted the email message with the form. This may be performed by, for example, comparing the text in the email message body or form to an email signature for associated with the worker that is stored in the task information database 180. If the message body or form contains an email signature, the update module 154 may remove the signature from the message body or form before adding the contents of the message body or form as a comment into the task information database 180.

The update module 154 and/or the system email client module 165 may then generate a result message that indicates the results of the message verification and database update at step 255. This may include the update module 154 generating the contents of the result message and communicating the contents to the system email client module 165. If the update module 154 determined that the response message could not be verified, the update module 154 may generate contents of an email message that may indicate the reason why the response message could not be verified. (A failed or successful verification may also be a result reported from other modules such as the authentication in the form module 150, token module 152 and/or system email client module 165.)

Alternatively, if the updated module and the database module 145 successfully update the task information database 180 on the response message, the update module 154 may generate the contents for an email message that indicates that the update was successful. The generated result message may be addressed to indicate that it is being sent by one of the email accounts used by the system email client module 165. The system email client module 165 may then transmit the generated result email message to the registered user email client module 120 at step 258.

Figure 3A:
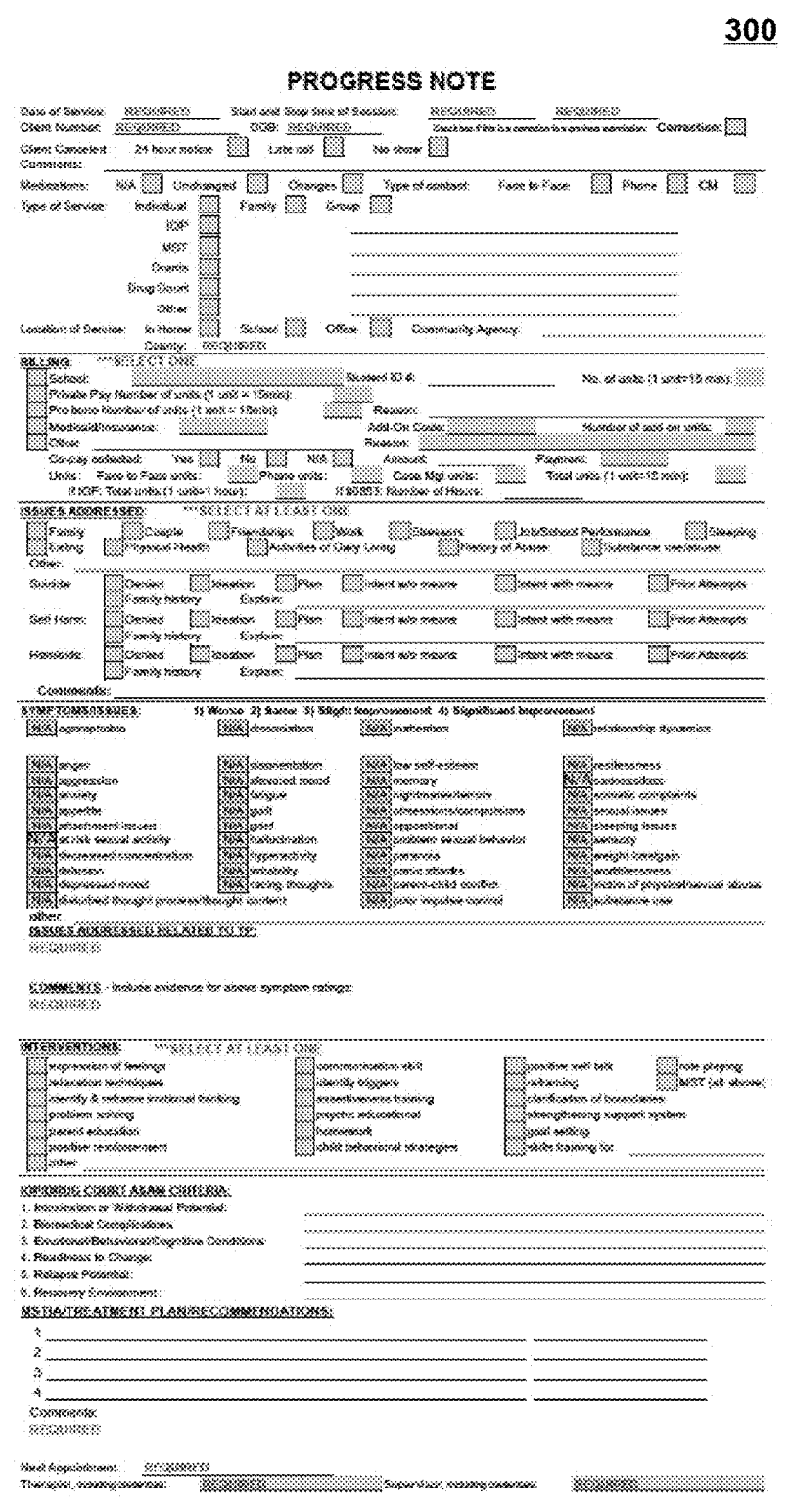

FIG. 3A illustrates an example of one possible form type 300. The form 300 may be encrypted. The form 300 may be attached or embedded, the contents of a mailto link that may be edited by the registered individual. Tokens may be encrypted or plain text strings which contain information to perform a transaction when sent to the information management system 110. A token may be one or multiple encrypted strings, files, passwords, cyphers, plain text, or other data which may contain information used to perform or authenticate. There may be more than one form or token. The form 300 and the tokens may be used separately or together and may be located anywhere in the message or the form 300.

FIG. 3B shows an example email display window 330 that may be used by the registered user email client module 120 to display the received email message. The email display window 330 includes a 'Reply' button 332, a control area 334, and a message body area 336, a 'Submit' button 338 and a form 340. The control area 334 may display control and/or header information associated with the administrative email message, such as the email addresses of the sender 335 and recipient of the message 337. The 'Reply' button 332 may respond to user input to generate a new display element (not depicted) to respond to the administrative email message.

The message body area 336 in the email display window 300 may display the body of the email message. The 'Submit' Button 338 and form 340 may be contained within the message body. As an example, the message body area 336 may include one or more editable forms 340, which the registered user completes. This form 340 may allow for various types of input such as multiple choice, fill-in-the-blank and graphical display adjustment. The form 340 may contain a series of hyperlinks. These hyperlinks may be in the body 336 and aid in the completion of the form 340. As an example, the message body area 336 may include one or more URIs or mailto hyperlinks, such as the "Submit" 338. These hyperlinks may be defined according to the mailto URI scheme or other appropriate format, and each may describe a new email message that may be generated by the registered user email client module 120 when that link is selected. Each of the hyperlinks may specify that the new email message includes an indicator of the purpose of the hyperlink. Each mailto hyperlink may include a token associated with the request. Further, each of the hyperlinks may specify that the subject field in the new email message includes an identifier of the client with which the subject matter of the new email is associated. Additionally, each of the hyperlinks may specify that the new email message should be addressed to an email account used by the information management system 110 and include the completed form.

The message may also include one or more Uniform Resource Identifiers (URIs) hyperlinks, or mailto links such as the 'Complete Task' link, the 'Comments' link and or 'Redirect Task' link. These links may be embedded behind images. The email may contain an attached or embedded form that the customer can access and include in the response email. Alternatively, the form may be accessed by a link and download to the registered user's device. These forms may also contain links for generating response messages. Alternatively although in this example the mailto link or form is delivered by email it may also be delivered by another media such as SMS, social media, webpage or application.

FIG. 3C shows an example message composition window 350 that may be displayed in response to a selection hyperlink from the message body area of FIG. 3B (Submit button 338). The message composition window 350 may include a Send button 360, a To area 365, a CC area 367, a BCC area 369, a Subject area 371, an attachment area 373, a message body area 375 and a form area 380. The Send button 360 in the message composition window 350 may be responsive to input from a registered individual such as a mouse click, keyboard input, or any other type of input. The different areas in the message composition window 350 display different portions of an email message. For example, the To area 365 includes text that indicates email addresses to which the email message is addressed, while the message body area 375 displays the contents of the body of the email message and the form 380. Each or any of these different areas may be editable based on user input. Changes to the contents of these areas may be change the corresponding portion of the email message.

FIG. 3C shows an example depiction wherein the 'Submit' button hyperlink from the message body area of FIG. 3B is selected. The To area 365 indicates that the message is addressed to task.mgmt@company.com. The Subject area 371 indicates that the subject of the message is "Response Task ID001-FORM$." In an implementation, the subject area 371 may include the token. The CC area 367, BCC area 369 are blank and message body area 375 contains a message and the form 380.

A registered individual may add text to the body 375 of the email message by adding text to or changing the text in the message body 375 or the form 380. As will be described in further detail below, the information management system 110 may interpret the text in the form 380 and/or the message body 375 of an email message in different ways, based on information indicated in the subject 371 of the email message and/or the purpose of the email message. For example, the body of the email message 375 may be interpreted by the information management system 110 as a comment related to the completion of a task recurrence, or the information management system 110 may expect the body of the email message 375 to include an email address of the new user to whom a task or task recurrence is being reassigned.

The above explanation of the use of forms may also be used by registered individuals to generate new forms used in the information management system 110. FIGS. 4A-C and 5A-C show a method for updating the task information database 180 with information related to new registered individual, composing of new forms, and/or new assignments of tasks to registered individual. FIGS. 5A-C are examples of forms that may be messaged from the information management system 110 to a registered individual that requires the new form. The form may be encrypted. The form may be attached or embedded, the contents of a mailto link that may be edited by the registered individual. Tokens may be encrypted or plain text strings which contain information to perform a transaction when sent to the information management system 110. A token may be one or multiple encrypted strings, files, passwords, cyphers, plain text, or other data which may contain information used to perform or authenticate. There may be more than one form or token. The form and the tokens may be used separately or together and may be located anywhere in the message. Alternatively or additionally, the form generator may be accessed through an application, plugin or secure web browser.

Figure 4A:
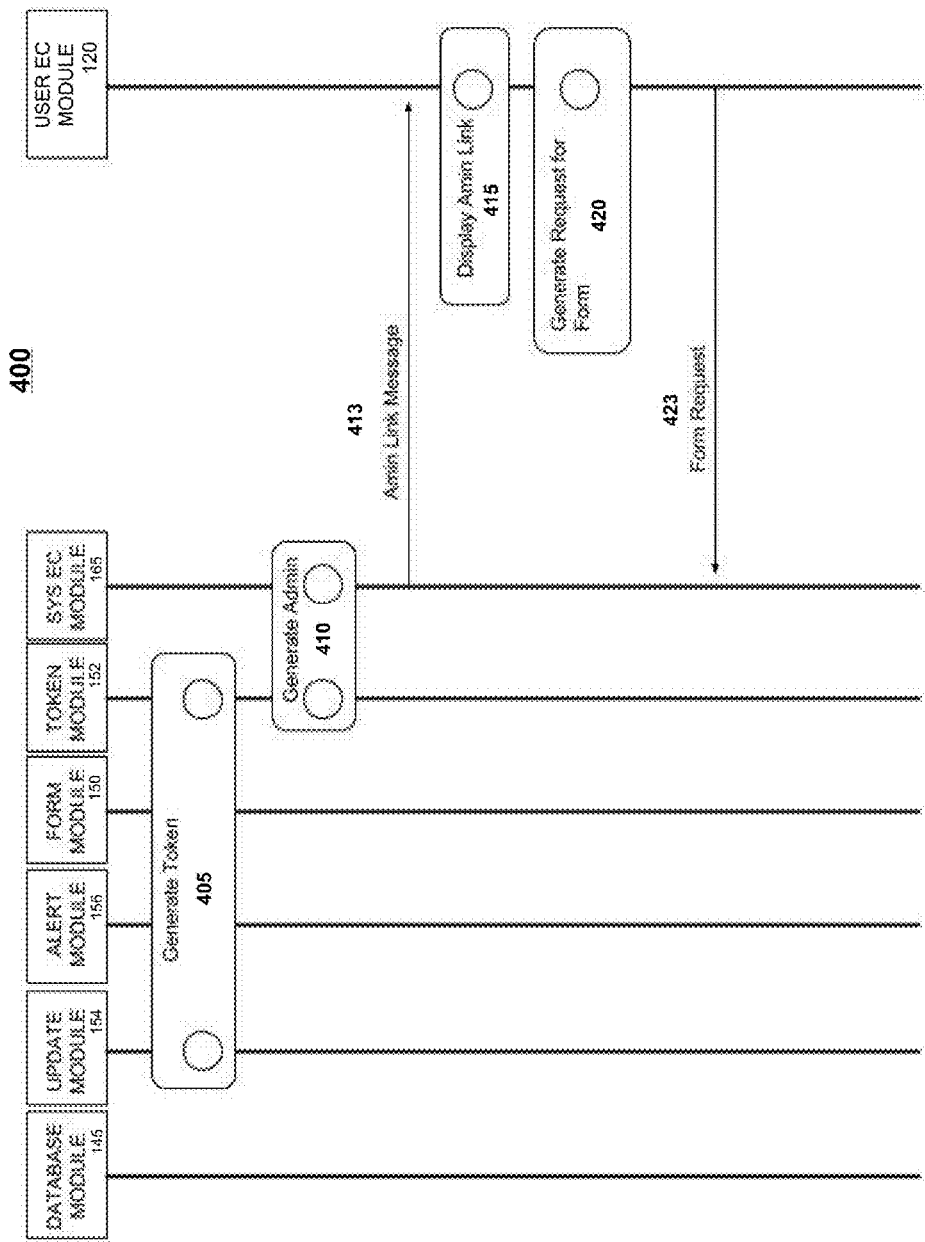
FIGS. 4A, 4B and 4C collectively illustrate a method for updating the task information database with information related to new registered individual, new forms, and/or new assignments of tasks to registered individual.
Figure 4B:
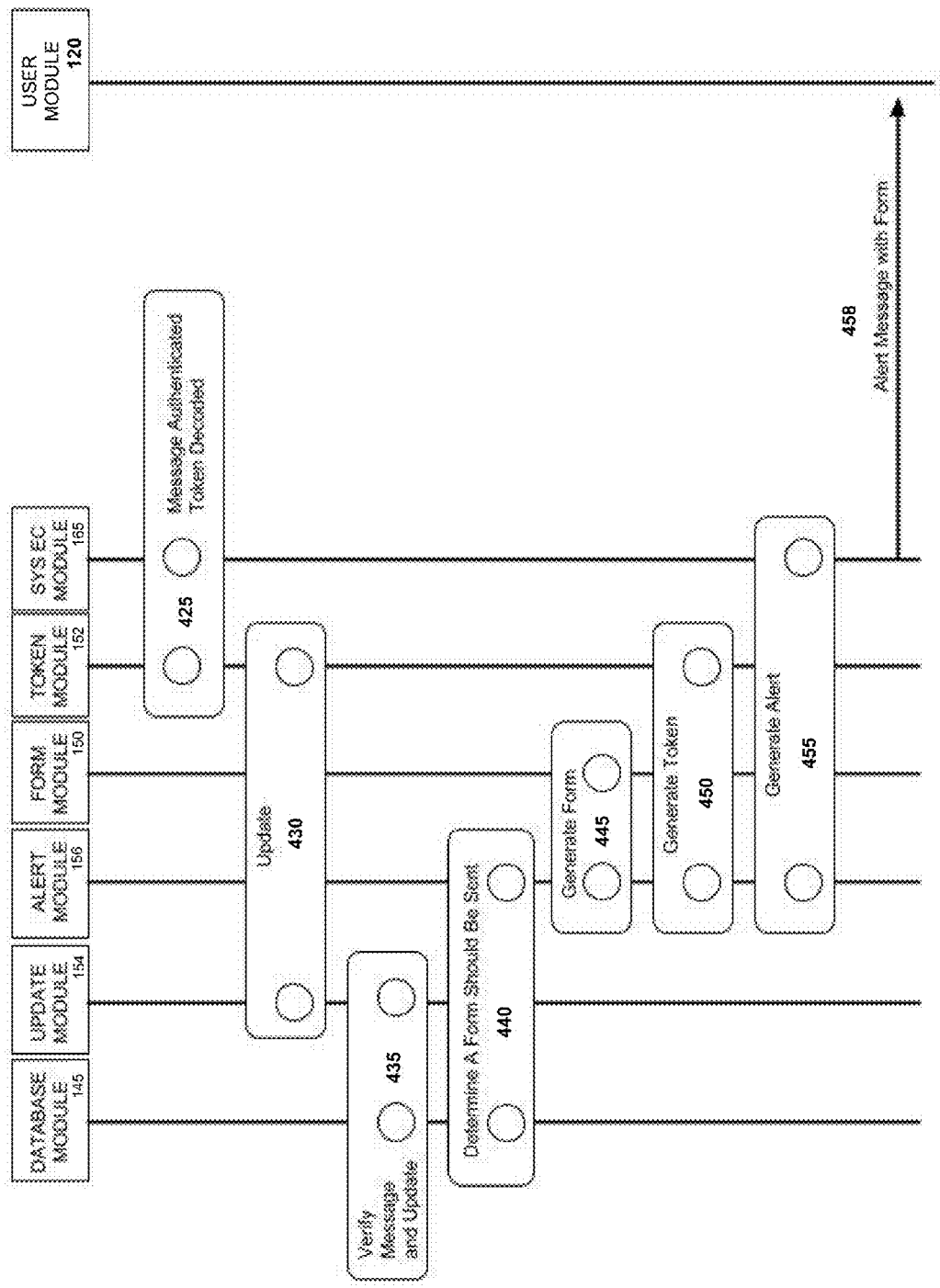
Figure 4C:
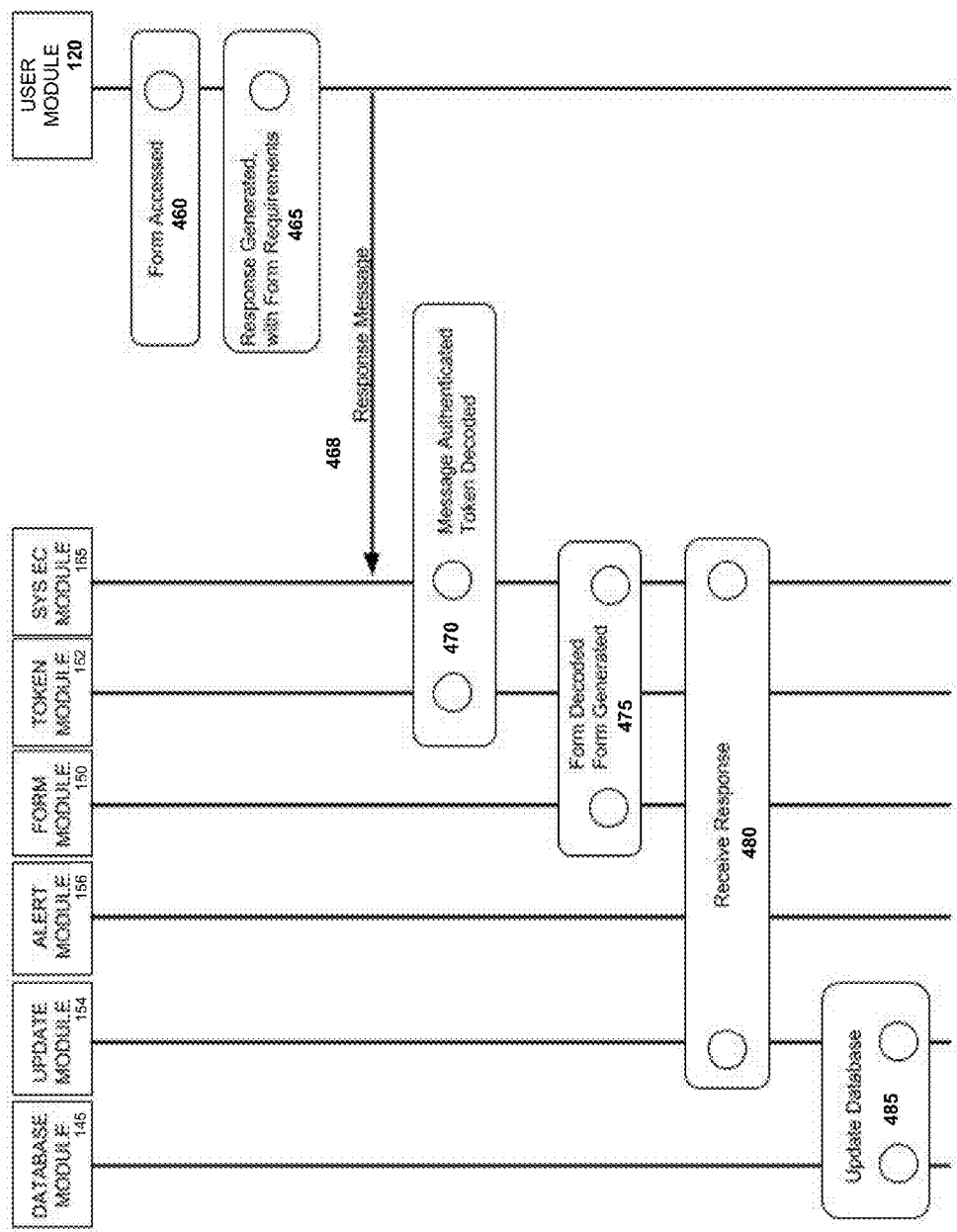
Figure 5A:
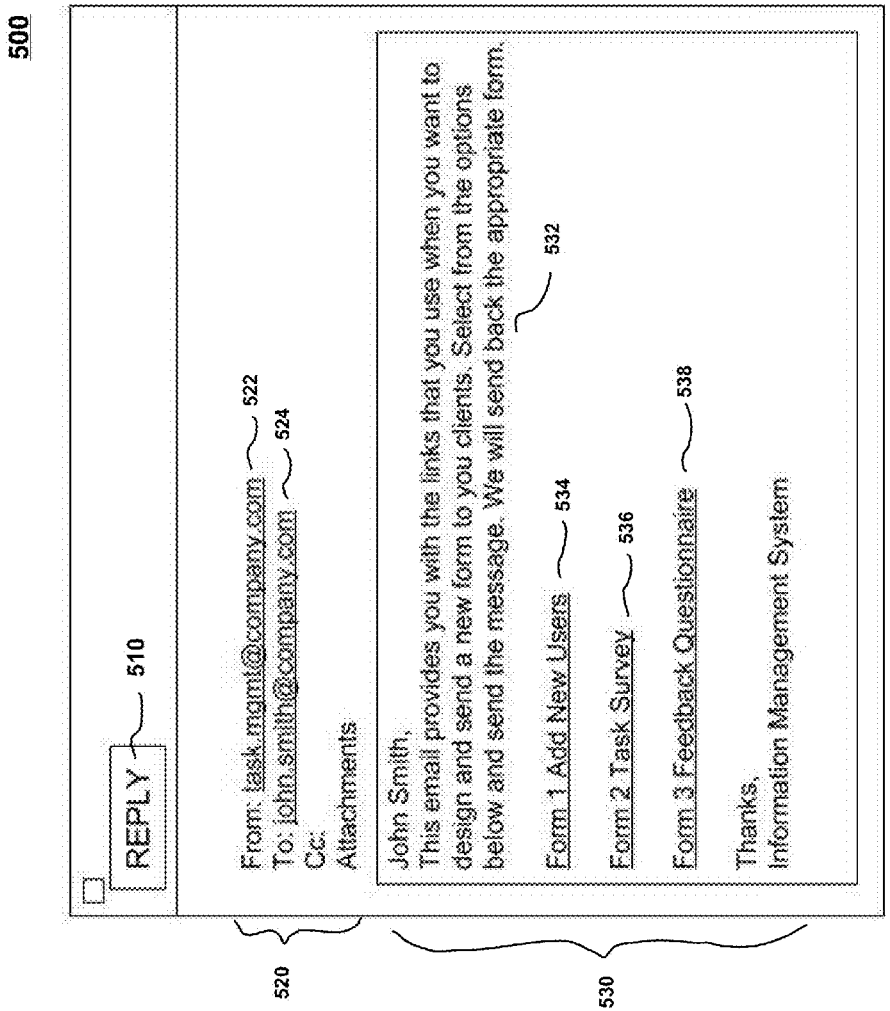
FIG. 5A. shows an example email display window that may be used by the registered user email client module to display the received administrative message.

The method 400 illustrated in the collective of FIGS. 4A-C may begin with the update module 154 and/or the token module 152 generating an administrative token for transmission to a registered individual at step 405. The token module 152 and/or the system email client module 165 generating administration link email message for transmission to the registered user email client module 120 at step 410. The administrative email message may indicate that it is being sent by one of the email accounts used by the system email client module 165.

Alternatively, this message may be sent by SMS or Social Media. The administrative email message may include one or more mailto hyperlinks and tokens that the registered user email client module may use to create a new email message. The hyperlinks and tokens may, for example, specify email messages for requesting one or more form generation messages in the information management system 110. Each form may have differing design and requirements.

The system email client module 165 may then transmit the generated administrative email message at step 413 to the registered user email client module 120. After receiving the administrative email message, the registered user email client module 120 may display the received administrative email message at step 415. The registered user email client module 120 may be used to generate a request for form at step 420. The registered user email client module 120 may then transmit the form request message to the system email client module 165 at step 423.

Referring now to FIG. 4B, the system email client module 165 and the token module 152 may then receive the form request email message and authenticate the email and decode the token at step 425. The token module 152 and the update module 154 may then receive the form request email message. This may include, for example, the update module 154 periodically querying the token module 152 for information related to new messages received by the system email client module 165 for one or more of the email accounts used by the information management system 110.

The update module 154 (in conjunction with the database module 145) may then verify the contents of the received form request message and update the task information database 180 accordingly at step 430. This may include, for example, the update module 154 parsing the contents of the received administrative update email message to determine if the message is formatted appropriately and has a valid token.

If the update module 154 successfully verifies the contents of the form request message, the update module 154 may communicate with the database module 145 to update the task information database 180 as specified in the form request message at step 435. In one example, the alert module 156 may receive information from the task information database 180 which indicates that a form is required to be sent to the registered individual at step 440. The alert module 156 determining that a message related to the form should be sent, requires a "Form 2 Task Survey form" and a token (described below). This determination may be performed based on data obtained via the form module 150 and token module 152.

The alert module 156 and/or the system email client module 165 may then generate an email message with form at step 445 and token at step 450 to be transmitted to the registered individual assigned with an alert generated at step 455. The email message and form may describe and aid in the composition of other forms as illustrated in FIGS. 5A-B. The email message may indicate that it is being sent by one of the email accounts used by the system email client module 165. The email message may include one or more hyperlinks that, when clicked by the registered individual, creates a new email response message that the registered individual may use to respond to the email message generated by the alert module 156 and/or system email client module 165. Further, the email message may also include one or more forms that provide information regarding the task recurrence to be performed and may be editable by the registered individual. The form may be an attachment, an embedded form, or predetermined email fields in which the registered individual responds to questions or requests. The alert message with the form may be sent by system email client module 165 to registered user email client module 120 at step 458.

Referring now to FIG. 4C, the user accesses the form at step 460 and completes the forms and generates the response message with the requirements for the new form at step 465. The registered user email client module 120 then transmits the message to the information management system 110 email client module at step 468. The system email client module 165 and the token module 152 may then receive the form generation email message and authenticate the email and decode the token at step 470. The system email client module 165 and the form module 150 may then receive the form generation email message and compose and save the new form for future use at step 475. The email client module and the update module 154 may then receive the new form response at step 480. The update module 154 and the database update the new form at step 485. The update module 154 (in conjunction with the database module 145) may then verify the contents of the received form message and update the task information database 180 accordingly. The form may be able to be accessed by more than one individual or may have a restricted access. The form may require a token to be included in the message. The form may also contain the requirements for the entire email message such as the body message and destinations of the message.

FIG. 5A shows an example email display window 500 that may be used by the registered user email client module 120 to display the received administrative message. Email display window 500 includes a 'Reply' button 510, a control area 520, and a message body area 530. Control area 520 may display control and/or header information associated with the administrative email message, such as the email addresses of the sender 522 and recipient of the message 524. The 'Reply' button 510 may respond to user input to generate a new display element (not depicted) to respond to the administrative email message.

The message body area 530 in the email display window may display the body of the administrative email message 532. As an example, the message body area may include one or more URIs or mailto hyperlinks, such as the "Form 1 Add New User" link 534, the "Form 2 Task Survey" link 536, and/or the "Form 3 Feedback Questionnaire" link 538. These hyperlinks links 534, 536, 538 may be defined according to the mailto URI scheme or other appropriate format, and each may describe a new email message that may be generated by the registered user email client module 120 when that link is selected. Each of the hyperlinks 534, 536, 538 may specify that the new email message includes an indicator of the purpose of the hyperlink.

For example, the "Form 2 Task Survey" mailto hyperlink 536 may include the action type parameter "FORM 2 TASK SURVEY$" to indicate that the message relates to the request for a Form 2 Task Survey to the task information database 180. Each hyperlink 534, 536, 538 may include a token associated with the request. Further, each of the hyperlinks 534, 536, 538 may specify that the subject field in the new email message includes an identifier of the client with which the subject matter of the new email is associated. Additionally, each of the hyperlinks 534, 536, 538 may specify that the new email message should be addressed to an email account used by the information management system 110.

The "Form 2 Task Survey" hyperlink 536 may include information that describes an email message that may be used to request a series of templates or interfaces for the generation of a form to the task information database 180.

FIG. 5B illustrates an example of one possible form type 540. In this example the form 540 is a template for designing a custom form. The registered individual may select from links such as Form maker 542, Your account 544, Security 546, Reports 548, and Messaging 550. These links 542, 544, 546, 548, 550 may generate other response emails that request other forms or these links 542, 544, 546, 548, 550 may be URL links which navigate the user to a URL on a web browser. The registered individual may input a 'personal reference title' 552, Title of the form' 554, specify the department 556, template type 558, and designate a distribution list 560. When completed the registered individual may select 'submit' 565 to generate a response email containing the completed form and addressed to the information management system 110. The form may be encrypted. The form may be attached or embedded, and the contents of a mailto link that may be edited by the registered individual. Tokens may be encrypted or plain text strings which contain information to perform a transaction when sent to the information management system 110. A token may be one or multiple encrypted strings, files, passwords, cyphers, plain text, or other data which may contain information used to perform or authenticate. There may be more than one form or token. The form and the tokens may be used separately or together and may be located anywhere in the message.

In order to complete a design of a form the registered individual may be required to receive a series of messages from the information management system 110 that contain forms that require more specific instruction. FIG. 5C is an example of an additional form 570 required after the completion of form 540. Multiple forms may also be included in a single email message. Form 570 may request an update 572, such as a monthly update, and inquire about certain topics 574. User buttons 576 may be used to delete response, save responses, preview the created email, and/or send the email. Alternatively or additionally the forms may be accessed via a web URL, application or plugin to the email client. That is, while the present discussion provides forms and exchanges forms via email, forms may be created and accessed via a web URL, a specific application or a plugin within the email client as well.

Figure 6A:
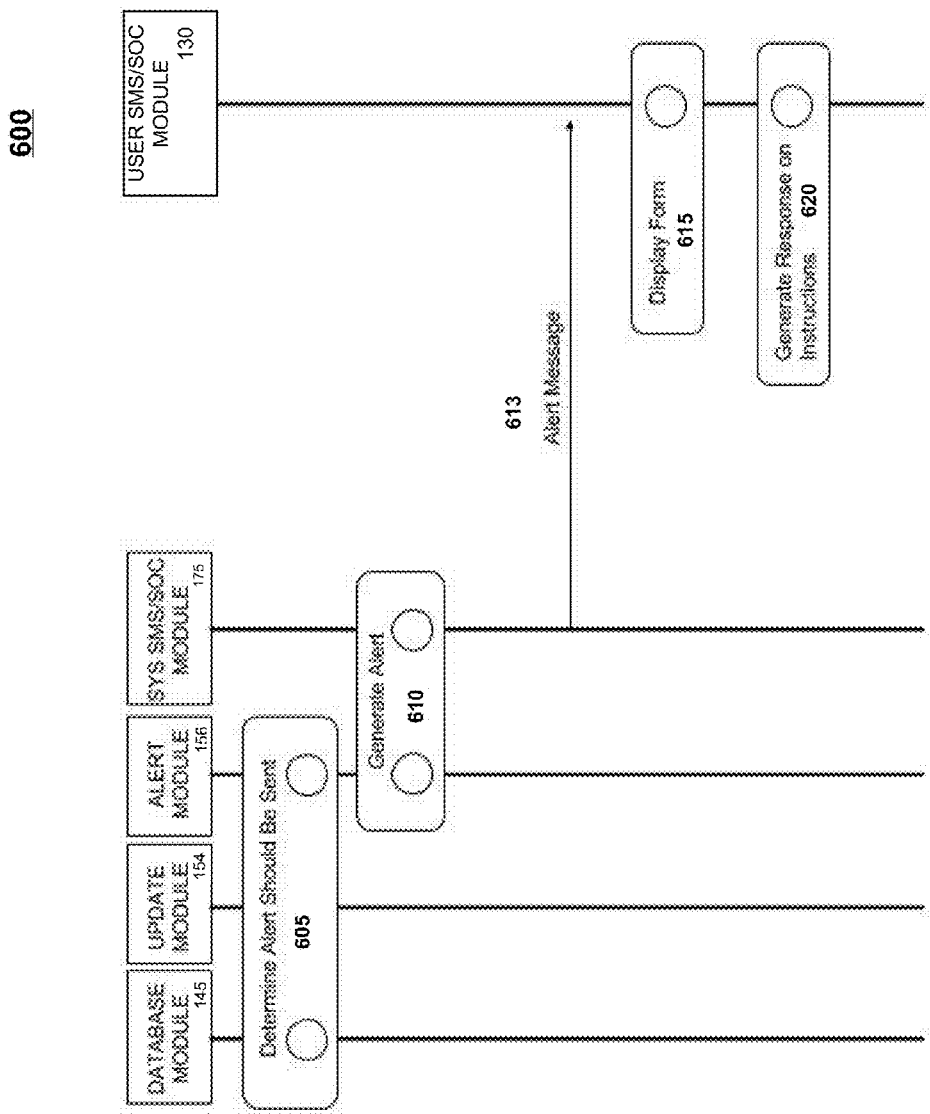
FIGS. 6A and 6B collectively illustrate a method for communication of an SMS or social media alert message to a registered user and for updating a task information database 180 based on the response to the alert message.
Figure 6B:
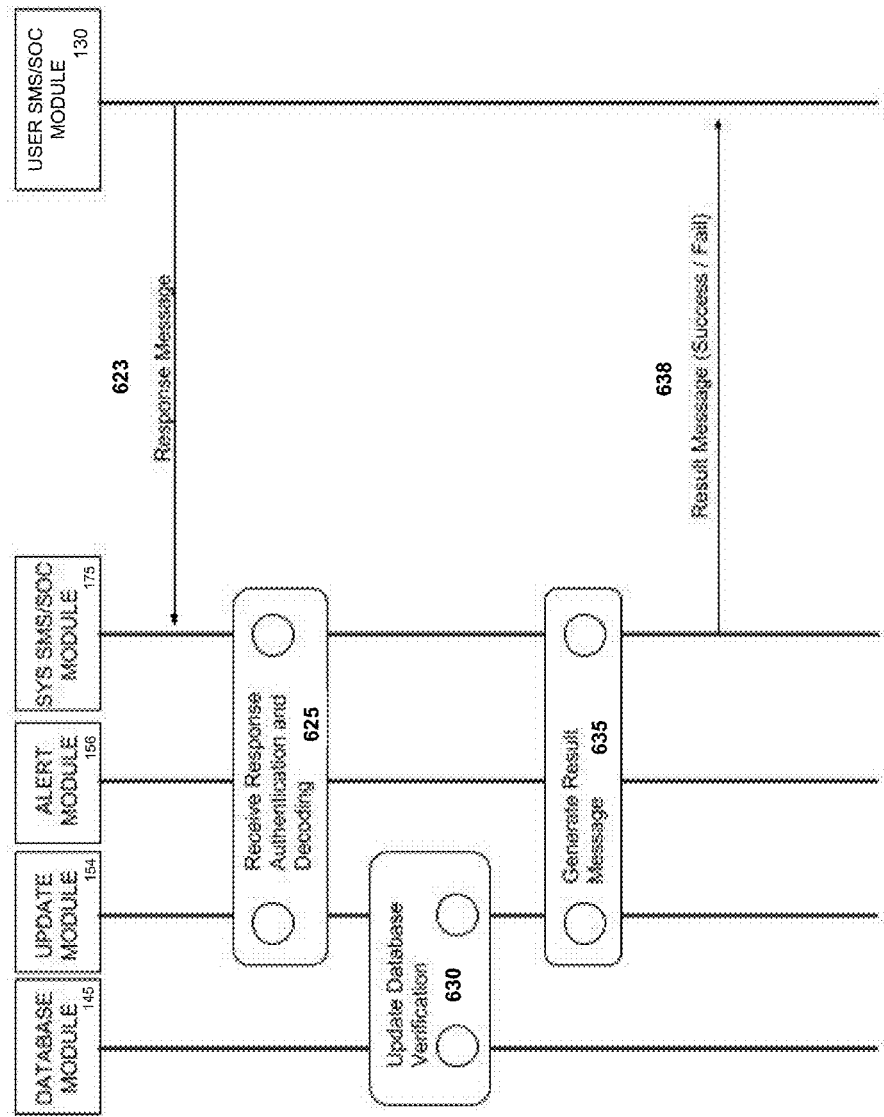

FIGS. 6A and 6B collectively illustrate a method 600 for communication of an SMS or social media alert message to a registered individual for updating a task information database 180 based on the response to the alert message. As will be described in further detail below, the SMS or social media alert message may indicate that a task recurrence is expected to be performed by the registered individual. FIGS. 6A and 6B show the database module 145, the update module 154, the alert module 156, the system email client module 165, and the device of the registered user's email client module 120.

Method 600 may begin with the alert module 156 determining that an alert related to the task recurrence should be sent at step 605. This determination may be performed based on data obtained via the database module 145 from the task information database 180. In one example, the alert module 156 may receive information from the task information database 180 that indicates, for a particular task recurrence, an alert SMS or social media message is past due and has not been sent. If tokens are required, they may be encrypted or plain text strings containing information to perform a transaction when sent to the information management system 110. A token may be one or multiple encrypted strings, files, passwords, cyphers, plain text or other data which may contain information used to perform or authenticate. There may be more than one form or token. The form and the tokens may be used separately or together and may be located anywhere in the message.

The alert module 156 and/or the system email client module 165 may then generate a SMS or social media message to be transmitted to the registered individual assigned to perform the recurrence of the task at step 610. The SMS or social media message may describe the task recurrence to be performed. The SMS or social media message may also include one or more attachments or forms that provide information regarding the task recurrence to be performed. The SMS or social media message may indicate that it is being sent by one of the SMS or social media accounts used by the system SMS or social media module 175. Further, the SMS or social media message may include one or more prompts that, when typed as a response by the registered individual, creates a message that the registered individual may use to respond to the message generated by the module and/or system SMS or social media module 175.

Alternatively or additionally, the SMS or social media message may include one or more hyperlinks that, when clicked by the registered individual, will create a message that the registered individual may use to respond to the message generated by the alert module 156 and/or system SMS or social media module 175.

The system alert SMS or social media module may then transmit the generated SMS or social media message at step 613. The SMS or social media message may be received by the registered individual SMS or social media message module 130, and displayed by the registered individual SMS or social media message module at step 615.

The registered individual may generate an SMS and/or social media response message by typing in the instructed response based on their knowledge of the task's completion at step 620. The message may include a token. The response message is addressed to the information management system 110.

Referring now to FIG. 6B, the registered individual's SMS and/or social media module 130 may, in response to a typed response and selecting of the send button, transmit the message based on the suggested prompts of the first message composition with the information management system 110 at step 623.

The system's SMS and social media module 175 and the update module 154 may then receive the message at step 625. This may include, for example, the update module 154 periodically querying the system's SMS or social media module for information related to new messages received by the system's SMS or social media module for one or more of the accounts used by the information management system 110. The message is authenticated and the token decoded at step 625.

The update module 154 (in conjunction with the database module 145) may then verify the contents of the received message and update the task information database 180 accordingly at step 630. This may include, for example, the update module 154 parsing the contents of the received email message to determine if the message is formatted appropriately.

If the update module 154 successfully verifies the contents of the token, the update module 154 may communicate with the database module 145 to update the task information database 180 accordingly. For example, if the received message indicates that a task recurrence has been completed or is incomplete, the task information database 180 may be updated to reflect the complete/incomplete status of the task recurrence.

Additionally, the update module 154 may add the contents of other information in the message to the task information database 180 as part of the task recurrence, such as a decoded form, for example. Additional information may include information not typed by the registered individual but included by the message format and design such as time the message was sent or the location of the user. The message contents may be the basis for other alerts, reports or forms.

Alternatively, if the received message is a reassigned message, the update module 154 may update the task information database 180 to reflect that the task or task recurrence has been reassigned to the new registered individual at step 630.

The update module 154 and/or the system SMS and social media module 175 may then generate a result message at step 635 that indicates the results of the message verification and database update. This may include the update module 154 generating the contents of the result message, and communicating the contents to the system's SMS and social media module. If the update module 154 determined that the response message could not be verified, the update module 154 may generate contents of a message indicating the reason why the response message could not be verified. (A failed or successful verification may also be a result reported from other modules such as the authentication in the SMS and social media module.)

Alternatively, if the updated module and the database module 145 successfully update the task information database 180 on the response message, the update module 154 may generate the contents for a message that indicates the update was successful. The generated result message may be addressed to indicate that it is being sent by one of the SMS or social media accounts used by the system's SMS or social media module at step 638.

Figure 7:
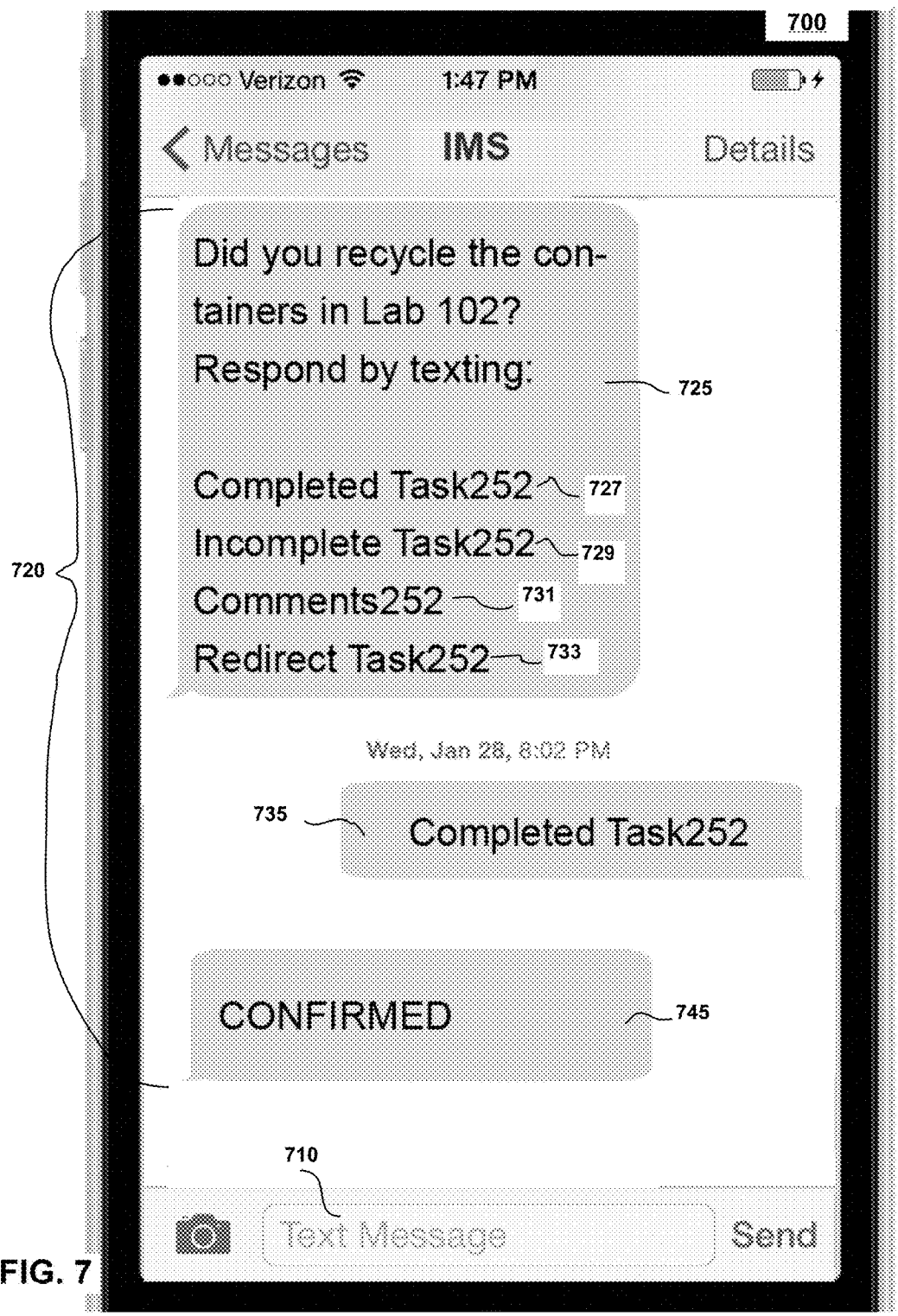
FIG. 7 shows an example SMS display window that may be used by the register individual SMS or social media module to display the SMS or social media message.

FIG. 7 shows an example SMS display window 700 that may be used by the register individual SMS or social media module 130 to display the SMS or social media message. The SMS or social media display window 700 includes a composition area 710, and a message body area 720. The composition area 710 may display the text the registered individual is sending before transmitting the message. The message area 720 may display the body of the SMS. As shown in FIG. 7, the message body area 720 display an example email message 725 that describes a task recurrence to be performed by an example worker named John Smith, for example 'Did you recycle containers in Lab 102?'. The message area 720 may also include one or more prompts, such as the "Text 'Completed Task252'" 727, the 'Text "Incomplete Task252'" link 729, the 'Text "Comments252" 731, and/or the 'Text "Redirect Task252" 733.

Each of the prompts indicates a type of an action to be performed by the information management system 110. Types of actions that the information management system 110 may perform include updating the task information database 180 to indicate that a task has been completed 727 or is incomplete 729, updating the task information database 180 with a comment related to a task 731, reassigning a task from the currently-assigned individual to a new individual 733, and/or other actions. Further, each of the prompts may specify that the message includes an identifier of the task recurrence that is described. In this case the task is '252.' Further, each of the prompts may specify that the new message should be addressed to an SMS or social media account used by the information management system 110. The specific set of prompts serve as one example, other variations may be utilized.

The "Completed Task252" prompt 727 may include information that, if received by the information management system 110, indicates to the information management system 110 that a task recurrence has successfully been completed, and that the task information database 180 should be updated accordingly. As an example, the task recurrence described in the message area 720 may have an identifier of "Completed Task252" 727 and an action type parameter that indicates that the task information database 180 should be updated to reflect completion of a task may be "Completed Task252" 727.

The "Incomplete Task252" prompt 729 may include information that, if received by the information management system 110, indicates to the information management system 110 that a task recurrence is incomplete. As an example, the task recurrence described in the message area 720 may have an identifier of "Incomplete Task252" 729 and an action type parameter that indicates that the task information database 180 should be updated to reflect that the task is incomplete may be "Incomplete Task252" 729.

The "Comments252" hyperlink 731 may include information that, if received by the information management system 110, indicates to the information management system 110 that the registered individual is providing a comment on a task recurrence. As an example, the task recurrence described in the message area 720 may have an identifier of "Comments252" 731 and an action type parameter that indicates that the task information database 180 should be updated to include the comments may be "Comments252" 731. Further to this example, the Incomplete Task prompt may describe a new message. As is described in further detail herein, by using a "Comments252" message 731, a registered individual may provide comments to the information management system 110.

The "Redirect Task252" prompt 733 may include information that, if received by the information management system 110, indicates to the information management system 110 that the registered individual is requesting that the task or task recurrence mentioned in the message area be reassigned to a different registered individual.

The task to be completed may be the completion of an attached or embedded form.

The registered individual SMS or Social Media module may receive a registered individual's input 735 that indicates that one of the prompts has been entered. The system 110 may confirm the individual input 745.

A user may add text to the body of the email message by adding text to or changing the text in the message body area 710. The information management system 110 may interpret the text in the message body 720 of a message in different ways, based on information indicated in the prompt of the message and/or the purpose of the message.

The system's SMS and social media module 175 may then transmit the generated message and share the message with the device of the registered individual's SMS and/or social media module 130. The message may be received and displayed by the registered individual's SMS and social media module 130. The message may also include messages for sending back updates, for example, 'Complete Task', the 'Comments' and or 'Redirect Task'. Alternatively, a link may be sent that allows the registered individual to access a web page where updates can be made.

The registered individual may generate an SMS and/or social media response message 735 by typing in the instructed response based on their knowledge of the task's completion. The message may include a token. The response message is addressed to the information management system 110.

The system's SMS or social media module 175 may then transmit the generated result message to the registered individual's SMS and/or social media module 130. In FIG. 7. This response is noted as 'CONFIRMED' 745.

When referred to herein, the term "computer-readable storage medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features and elements are described above in particular combinations, each feature or element can be used alone or in any combination with the other features and elements. For example, each feature or element as described above with reference to FIGS. 1-7 may be used alone without the other features and elements or in various combinations with or without other features and elements. Sub-elements of the methods and features described above with reference to FIGS. 1-7 may be performed in any arbitrary order (including concurrently), in any combination or sub-combination.

What is claimed:

1. A method for improving security of a digital transaction using Simple Mail Transfer Protocol (SMTP), the method comprising:
   determining to whether an alert related to a task is sent to a registered individual;
   on a condition that the alert related to the task is to be sent, generating an email message, wherein the email includes at least one mailto link, a token, and a form for the registered individual to complete;
   transmitting, using SMTP, the email message to the registered individual;
   receiving, using SMTP, a response email from the registered individual responsive that includes information entered by the registered individual in the form, wherein the response email is generated by the registered individual selecting the mailto link and includes the token; and
   authenticating the response email; and
   on a condition that the response email is authenticated, decoding the information that the registered individual entered in the form using the token to determine responses of the registered individual; and performing the digital transaction by updating an information database with the responses of the registered individual.

2. The method of claim 1 further comprising generating a result message to be sent to the registered individual.

3. The method of claim 2 further comprising sending, using SMTP, the result message to the registered individual.

4. The method of claim 3 wherein the result message is responsive to the registered individual's response email.

5. The method of claim 4 further comprising determining whether the result message was successfully delivered to the registered individual.

6. A method for improving security of a digital transaction using Simple Mail Transfer Protocol (SMTP), the method comprising:
   determining to whether an alert related to a task is sent to a registered individual;
   on a condition that the alert related to the task is to be sent, generating an alert message, wherein the alert message includes a first mailto link;
   transmitting the alert message to the registered individual;
   receiving, using SMTP, a first response from the registered individual, wherein the first response is generated by the registered individual selecting the first mailto link;
   transmitting, using SMTP, a form message to the registered individual, wherein the form message includes a second mailto link, a token and a form for the registered individual to complete;
   receiving, using SMTP, a second response from the registered individual, wherein the second response is generated by the registered individual selecting the second mailto link and includes information entered by the registered individual in the form;
   authenticating the second response; and
   on a condition that the second response is authenticated, performing the digital transaction by updating an information database with the information entered by the registered individual in the form based on the token.

7. The method of claim 6 further comprising generating a result message to be sent to the registered individual.

8. The method of claim 7 further comprising sending the result message to the registered individual.

9. The method of claim 8 wherein the result message is responsive to the second response.

10. The method of claim 9 further comprising determining whether the result message was successfully delivered to the registered individual.

11. The method of claim 6 wherein the alert message is an Short Message Service (SMS) message.

12. The method of claim 6 wherein the alert message is a social media message.

13. A system for improving security of a digital transaction using Simple Mail Transfer Protocol (SMTP), the system comprising:
    a network interface that is communicatively coupled to a client device of a registered individual;
    a memory that stores an information database; and
    a processor that is communicatively coupled to the network interface and the memory;
    wherein the processor:
    determines whether an alert related to a task is sent to the registered individual,
    on a condition that the alert related to the task is to be sent, generates an alert message, wherein the alert message includes a first mailto link,
    transmits, via the network interface, the alert message to the client device of the registered individual,
    receives, using SMTP via the network interface, and a first response from the registered individual, wherein the first response is generated by the registered individual selecting the first mailto link on the client device,
    transmits, using SMTP via the network interface, a form message to the registered individual, wherein the form message includes a second mailto link, a token and a form for the registered individual to complete on the client device,
    receives, using SMTP via the network interface, a second response from the registered individual, wherein the second response is generated by the registered individual selecting the second mailto link and includes information entered by the registered individual in the form,
    authenticates the second response, and
    on a condition that the second response is authenticated, performs the digital transaction by updating the information database with the information entered by the registered individual in the form based on the token.

14. The system of claim 13 wherein the alert message is an Short Message Service (SMS) message.

15. The system of claim 13 wherein the alert message is a social media message.

16. The system of claim 13 wherein the processor further generate a result message to be sent to the registered individual.

17. The system of claim 16 wherein the processor further sends, via the network interface, the result message to the registered individual.

18. The system of claim 17 wherein the processor further determines whether the result message was successfully delivered to the registered individual.

19. The system of claim 13 wherein the alert message is a Short Message Service (SMS) message.

20. The system of claim 13 wherein the alert message is a social media message.

* * * * *